June 4, 1963
B. H. GWYNN ET AL
3,092,670
OXO PROCESS FOR THE PRODUCTION OF ALCOHOLS
Filed Aug. 16, 1957
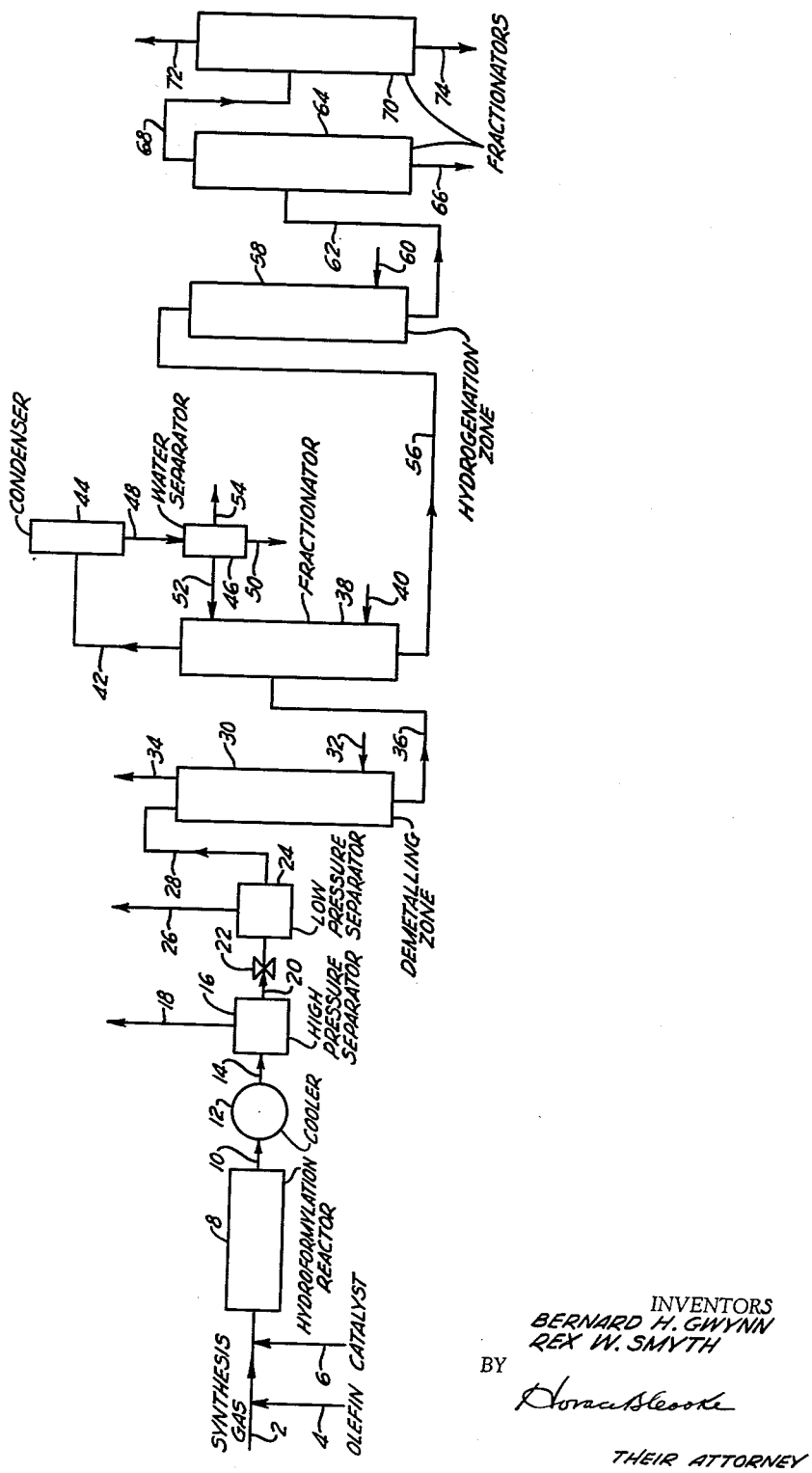
INVENTORS
BERNARD H. GWYNN
REX W. SMYTH
BY
THEIR ATTORNEY

United States Patent Office 3,092,670
Patented June 4, 1963

3,092,670
OXO PROCESS FOR THE PRODUCTION OF ALCOHOLS
Bernard H. Gwynn and Rex W. Smyth, Tarentum, Pa., assignors to Gulf Research & Development Company, Pittsburgh, Pa., a corporation of Delaware
Filed Aug. 16, 1957, Ser. No. 678,712
6 Claims. (Cl. 260—638)

This application relates to a process for preparing alcohols and particularly a process for preparing increased amounts of alcohol by the Oxo process while decreasing the formation of polymers.

Oxo alcohols are generally prepared in two stages. In the first stage, hydrogen and carbon monoxide are reacted with an olefin in the presence of a hydroformylation reaction catalyst at an elevated temperature and an elevated pressure to obtain a hydroformylation reaction mixture predominating in an aldehyde having one more carbon than said olefin. The hydroformylation reaction mixture, preferably after removing the hydroformylation reaction catalyst therefrom, is passed to a second or hydrogenation stage wherein the aldehyde mixture is converted to an alcohol product predominating in the corresponding alcohol.

In the product from the first or hydroformylation reaction stage there are to be found not only the desirable aldehydes, but also unreacted hydrogen, carbon monoxide and olefins, dissolved hydroformylation reaction catalyst such as cobalt carbonyl, some alcohol and polymeric material such as acetals, unsaturated ethers, hydroxy aldehydes and unsaturated aldehydes. The removal of hydrogen and carbon monoxide, as well as catalyst, in some cases, from such mixture prior to converting, by hydrogenation, the aldehydes to the corresponding alcohols is conventional. We have found that by employing the further expedient of fractionating the demetalled hydroformylation reaction product in the presence of steam to remove unreacted olefin therefrom and thereafter hydrogenating the product remaining to convert the aldehydes to the corresponding alcohols, the amount of alcohol produced is increased while the amount of polymer formed is decreased.

The process of this invention can further be illustrated by reference to the drawing which shows a flow diagram of a preferred embodiment.

Referring to the drawing, synthesis gas is introduced into the system by line 2, olefin by line 4 and catalyst by line 6, and the mixture passed into hydroformylation reactor 8 wherein a hydroformylation reaction mixture predominating in an aldehyde having one more carbon atom than said olefin is obtained along with unreacted hydrogen, carbon monoxide and olefin, dissolved hydroformylation reaction catalyst such as cobalt carbonyl, some alcohol and polymeric material such as acetals, unsaturated ethers, hydroxy aldehydes and unsaturated aldehydes. In this reaction practically any organic compound having olefinic linkages can be employed, such as a monoolefin, diolefin, straight or branched, cycloolefin, etc. In particular, olefins having from about 4 to about 20 carbon atoms are preferred, such as pentene, heptene, tetrapropylene, etc. Hydrogen to carbon monoxide mol ratio is preferably about 1:1 but can vary from about 0.75:1 to about 5:1. The temperature can be about 350° F., preferably about 300° to about 375° F., while the pressure is above about 1500 pounds per square inch, preferably about 3000 to about 5000 pounds per square inch. The catalyst is preferably a cobalt salt of any suitable organic acid such as a fatty acid, preferably one containing at least 6 carbon atoms, or a naphthenic acid. Preferred salts are cobalt octanoate and cobalt naphthenate. In general the catalyst should be introduced in amount corresponding to about one atomic proportion of cobalt for each 600 mols of olefin. At least about one mol each of hydrogen and carbon monoxide should be used per mol of olefin. A residence time of at least about 10 minutes and preferably about 30 to about 60 minutes, is sufficient to obtain the hydroformylation reaction product.

The hydroformylation reaction product is removed from the hydroformylation reactor by line 10 and passed to cooler 12 wherein the temperature thereof is reduced, for example, to a temperature of about 100° to about 120° F. From the cooler the hydroformylation reaction product is passed by line 14 to high pressure separator 16 wherein some excess synthesis gas is removed by line 18. The hydroformylation reaction product is removed from high pressure separator 16 by line 20 containing a pressure reducing valve 22 and introduced into low pressure separator 24 at a pressure of about 250 to about 500 pounds per square inch wherein additional synthesis gas is removed overhead by overhead line 26.

The hydroformylation reaction product at the reduced temperature and pressure and from which excess synthesis gas has been removed is subsequently passed by line 28 into demetalling zone 30 wherein the hydroformylation reaction catalyst, generally cobalt carbonyl, and other metal carbonyls which may be present, are removed therefrom. This can be done, for example, by packing the demetalling zone with an inert material such as pumice and heating the demetalling zone by any suitable means. Thus steam can be employed from line 32 either in direct contact with the hydroformylation reaction mixture or in indirect relationship therewith, to obtain a temperature sufficiently high to decompose the metal carbonyl and deposit the free metal on the pumice. Carbon monoxide resulting from the decomposition can be removed from the demetalling zone by line 34. A temperature of about 200° to about 400° F. and a pressure of about 25 to about 500 pounds per square inch is sufficient for the demetalling operation.

The hydroformylation reaction product removed from demetalling zone 30 by line 36 therefore has been demetalled and unreacted synthesis gas and carbon monoxide resulting from decomposition of the metal carbonyl has been separated therefrom. Among the materials still present in the hydroformylation reaction product in addition to the desirable aldehydes are unreacted olefins and polymeric materials such as acetals, unsaturated ethers, hydroxy aldehydes and unsaturated aldehydes. In accordance with the process of this invention the hydroformylation product in line 36 is fractionated in the presence of steam to remove only unreacted olefins therefrom and the remainder of the product, including the defined polymeric material, is passed to the hydrogenation zone to obtain the desired alcohol product.

The removal of olefin from the hydroformylation reaction product is advantageous in many respects. If it were not removed from the hydroformylation reaction product it would be converted to the corresponding paraffin in the hydrogenation zone and thus not yield a product of value comparable to that of the alcohol. In addition the recovered olefin can be blended with gasoline and thereby produce a more valuable component in such gasoline with regard to octane number than is the corresponding paraffin which would be recovered from the hydrogenation product were the olefin not first separated from the demetalled product. In addition the hydrogenation product fractionation system can be made smaller if it does not have to handle the paraffin which would be produced by hydrogenation of the olefin.

While it is absolutely necessary in accordance with the present process to separate and remove the unreacted olefin from the demetalled hydroformylation reaction product prior to hydrogenation, it is also imperative that the polymeric material, such as acetals, unsaturated ethers, hydroxy aldehydes and unsaturated aldehydes, not be separated therefrom but passed to the hydrogenation stage along with the aldehydes. We have found that the amount of alcohol produced in the process is increased and the total amount of polymer formed decreased when, subsequent to removal of olefin from the hydroformylation reaction product, the total product remaining is passed to the hydrogenation stage. Removal of polymeric material as well as olefin from the demetalled hydroformylation reaction product prior to hydrogenation results in a lower yield of alcohol and a higher amount of total polymer.

In accordance with the above, therefore, the product in line 36 is passed to fractionator 38 wherein steam is introduced by line 40. It is absolutely essential to employ steam to effect the separation of olefin from the hydroformylation reaction product in order to inhibit the formation of additional polymeric material under the fractionation conditions employed. The amount of steam required can vary over a wide limit, but generally amounts to at least about 2 and preferably about 10 to about 50 percent by weight of the product introduced into fractionator 38 by line 36. A reboiler temperature of about 100° to about 550° F. and preferably about 150° to about 450° F., and a pressure of about one to about 50 pounds per square inch absolute, preferably about 2 to about 20 pounds per squire inch absolute are satisfactory.

Under these conditions, a mixture of olefins and steam is removed overhead by line 42 and passed to condenser 44 maintained at a suitable low temperature of about 80° to about 350° F. The mixture containing water condensed steam is passed to water separator 46 by line 48, wherein water is removed from the system by line 50. A portion of the olefin is returned to fractionator 38 by line 52 to serve as reflux therein. An amount sufficient to maintain a reflux ratio of about 0.5 to about 10 is satisfactory for operation in accordance with the present invention. The remainder of the olefin is removed from water separator 46 by line 54 and can be used in any desired manner, for example, by blending in gasoline.

The remainder of the product in fractionator 38, including the polymeric material previously referred to, is removed therefrom and passed by line 56 to hydrogenation zone 58 wherein the product introduced therein is subjected to hydrogenation condition in the presence of a hydrogenation catalyst such as nickel to obtain an alcohol products. Hydrogen for hydrogenation in the amount of 8800 standard cubic feet per barrel of feed, for example, is introduced into hydrogenation zone 58 by line 60. A temperature of about 250° to about 450° F. and a pressure of about 500 to about 2000 pounds per square inch are sufficient for hydrogenation.

The alcohol product can then be purified by removing the same from hydrogenation zone 58 by line 62 and passing it to fractionator 64, maintained at a reboiler temperature of about 250° to about 550° F. and a pressure of about one to about 20 pounds per square inch absolute, wherein polymer is removed from the base thereof by line 66 and a mixture comprising unconverted aldehyde and alcohol by overhead line 68. The overhead is then introduced into fractionator 70, which is operated at a reboiler temperature of about 225° to about 550° F. and a pressure of about one to about 20 pounds per square inch absolute. The aldehyde fraction is removed overhead by line 72 and the desired alcohol by line 74. In order to aid in the separation of alcohol from aldehyde in fractionator 70, it is preferred that a small amount of olefin be present therein. This can be effected, for example, by the expedient of not removing all of the unreacted olefin from the hydroformylation reaction mixture in fractionator 38 and permitting about 10 to about 20 percent, by weight of the unreacted olefin to remain in the stream in line 56. When the fractionation in fractionator 70 is carried out in this manner, the unreacted olefin present is removed along with the unconverted aldehyde in line 72. Separation of olefin from aldehyde can be effected, if desired, in any suitable manner.

The process of this invention can further be illustrated by the following examples.

*Example I*

1930 grams of heptene were reacted with 27.1 standard cubic feet of hydrogen and 22.2 standard cubic feet of carbon monoxide in the presence of 6.5 grams of the cobalt salt of isooctanoic acid for a period of 46 minutes at a temperature of about 350° F. and a pressure of 3500 pounds per square inch to obtain a hydroformylation reaction product predominating in isooctylaldehyde. The product was passed downwardly into a demetalling zone containing pumice and having a temperature near the top of 82° F. and adjacent the base of 380° F. and a pressure of 270 pounds per square inch. As a result of such action cobalt carbonyl was decomposed and cobalt deposited on the pumice. 2400 grams of the cobalt-free product was then distilled at a reboiler temperature of 223° F. and a pressure of 14.7 pounds per square inch absolute with 290 grams of steam added to the reboiler. 400 grams of unreacted olefin out of 482.4 grams of unreacted olefin in the cobalt-free product was removed overhead. 1000 grams of the bottoms product from this distillation was passed to a hydrogenation zone containing nickel on alumina catalyst and maintained at a maximum temperature of 380° F. and a pressure of 1000 pounds per square inch. The hydrogenation product obtained comprised 888.6 grams of isooctyl alcohol and 115 grams of a dark viscous polymer.

*Example II*

1000 grams, or the remainder, of the bottoms product from the distillation of Example I was further distilled at a reboiler temperature of 405° F. and a pressure of 14.7 pounds per square inch absolute with 472 grams of steam added to the reboiler. 164.8 grams of a dark viscous polymer was obtained as bottoms and 835.2 grams of hydroformylation reaction product recovered overhead. The polymer bottoms was found to contain 19.8 grams of alcohol. The hydroformylation reaction product was subjected to hydrogenation conditions identical to those employed in Example I, and a product was obtained yielding 835 grams of alcohol and 8.8 grams of polymer. The total alcohol therefore amounted to 854.8 grams and the polymer to 153.8 grams.

A comparison of Examples I and II with each other will illustrate the advantages of the present invention. In Example I, operated in accordance with our invention, wherein the total polymeric product in the hydroformylation reaction product is not separated therefrom but passed to the hydrogenation zone along with the aldehydes, the amount of alcohol was 888.6 grams and polymer 115 grams. In Example II, on the other hand, wherein the polymeric material is removed from the hydroformylation reaction product prior to hydrogenation, the total amount of alcohol was 854.8 grams and polymer 153.8 grams. Thus by operating in accordance with our invention we were able to obtain about 3.94 percent by weight more alcohol while obtaining about 33.7 percent by weight less polymer.

Obviously, many modifications and variations of the invention, as hereinabove set forth, can be made without departing from the spirit and scope thereof, and therefore only such limitations should be imposed as are indicated in the appended claims.

We claim:
1. A process for producing alcohols which comprises reacting an olefin with hydrogen and carbon monoxide in the presence of a hydroformylation reaction catalyst at an elevated temperature and an elevated pressure to obtain a hydroformylation reaction mixture comprising an aldehyde having one more carbon than said olefin, unreacted hydrogen, carbon monoxide and olefin, dissolved hydroformylation reaction catalyst and polymeric material, removing from said mixture said unreacted hydrogen, carbon monoxide and olefin and dissolved hydroformylation reaction catalyst, said unreacted olefin having been removed by contact with steam, subjecting the remainder of said mixture to hydrogenation conditions to obtain an alcohol product, and thereafter recovering the alcohol from said alcohol product.

2. A process for producing alcohols which comprises reacting an olefin with hydrogen and carbon monoxide in the presence of a hydroformylation reaction catalyst at an elevated temperature and an elevated pressure to obtain a hydroformylation reaction mixture comprising an aldehyde having one more carbon than said olefin, unreacted hydrogen, carbon monoxide and olefin, dissolved hydroformylation reaction catalyst and polymeric material, removing from said mixture said unreacted hydrogen and carbon monoxide and dissolved hydroformylation reaction catalyst, additionally removing from the resulting mixture unreacted olefin at a reboiler temperature of about 100° to about 550° F. in the presence of steam, subjecting the remainder of said mixture to hydrogenation conditions to obtain an alcohol product, and thereafter recovering the alcohol from said alcohol product.

3. A process for producing alcohols which comprises reacting an olefin with hydrogen and carbon monoxide in the presence of a hydroformylation reaction catalyst at an elevated temperature and an elevated pressure to obtain a hydroformylation reaction mixture comprising an aldehyde having one more carbon than said olefin, unreacted hydrogen, carbon monoxide and olefin, dissolved hydroformylation reaction catalyst and polymeric material, removing from said mixture said unreacted hydrogen and carbon monoxide and dissolved hydroformylation reaction catalyst, additionally removing from the resulting mixture a portion of the unreacted olefin in the presence of steam, subjecting the remainder of said mixture to hydrogenation conditions to obtain an alcohol product, and thereafter recovering the alcohol from said alcohol product.

4. A process for producing alcohols which comprises reacting an olefin with hydrogen and carbon monoxide in the presence of a hydroformylation reaction catalyst at an elevated temperature and an elevated pressure to obtain a hydroformylation reaction mixture comprising an aldehyde having one more carbon than said olefin, unreacted hydrogen, carbon monoxide and olefin, dissolved hydroformylation reaction catalyst and polymeric material, removing from said mixture said unreacted hydrogen and carbon monoxide and dissolved hydroformylation reaction catalyst, additionally removing from the resulting mixture about 80 to about 90 percent by weight of the unreacted olefin in the presence of steam, subjecting the remainder of said mixture to hydrogenation conditions to obtain an alcohol product, and thereafter recovering the alcohol from said alcohol product.

5. A process for producing alcohols which comprises reacting an olefin with hydrogen and carbon monoxide in the presence of a hydroformylation reaction catalyst at an elevated temperature and an elevated pressure to obtain a hydroformylation reaction mixture comprising an aldehyde having one more carbon than said olefin, unreacted hydrogen, carbon monoxide and olefin, dissolved hydroformylation reaction catalyst and polymeric material, removing from said mixture said unreacted hydrogen and carbon monoxide and dissolved hydroformylation reaction catalyst, additionally removing from the resulting mixture about 80 to about 90 percent by weight of the unreacted olefin at a reboiler temperature of about 100° to about 550° F. in the presence of steam, subjecting the remainder of said mixture to hydrogenation conditions to obtain an alcohol product, and thereafter recovering the alcohol from said alcohol product.

6. A process for producing alcohols which comprises reacting an olefin with hydrogen and carbon monoxide in the presence of a hydroformylation reaction catalyst at an elevated temperature and an elevated pressure to obtain a hydroformylation reaction mixture comprising an aldehyde having one more carbon than said olefin, unreacted hydrogen, carbon monoxide and olefin, dissolved hydroformylation reaction catalyst and polymeric material, removing from said mixture said unreacted hydrogen and carbon monoxide and dissolved hydroformylation reaction catalyst, passing the resulting mixture to a fractionator, introducing steam into said fractionator, removing overhead from said fractionator a mixture of unreacted olefin and steam, separating said steam from said latter mixture, recycling a portion of said removed olefin to said fractionator, removing from said fractionator the remainder of the hydroformylation reaction product, subjecting said remainder to hydrogenation conditions to obtain an alcohol product, and thereafter recovering the alcohol from said alcohol product.

References Cited in the file of this patent

UNITED STATES PATENTS

| 2,688,591 | Hill | Sept. 7, 1954 |
| 2,744,939 | Kennel | May 8, 1956 |
| 2,779,796 | Munger | Jan. 29, 1957 |
| 2,850,541 | Thomson | Sept. 2, 1958 |